April 8, 1958     J. T. LANDES ET AL     2,829,772
PURIFIER
Filed Feb. 1, 1956     3 Sheets-Sheet 1
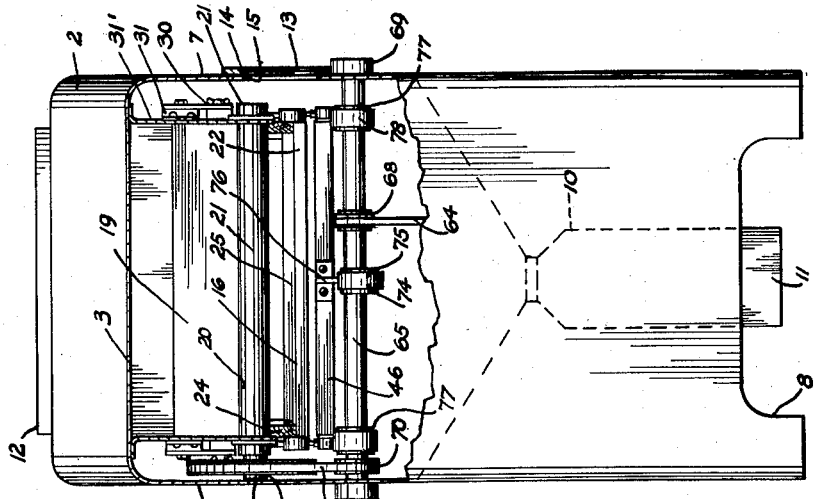
INVENTOR.
John T. Landes and
Roger S. Greenough
BY
ATTORNEYS.

April 8, 1958  J. T. LANDES ET AL  2,829,772
PURIFIER
Filed Feb. 1, 1956  3 Sheets-Sheet 2
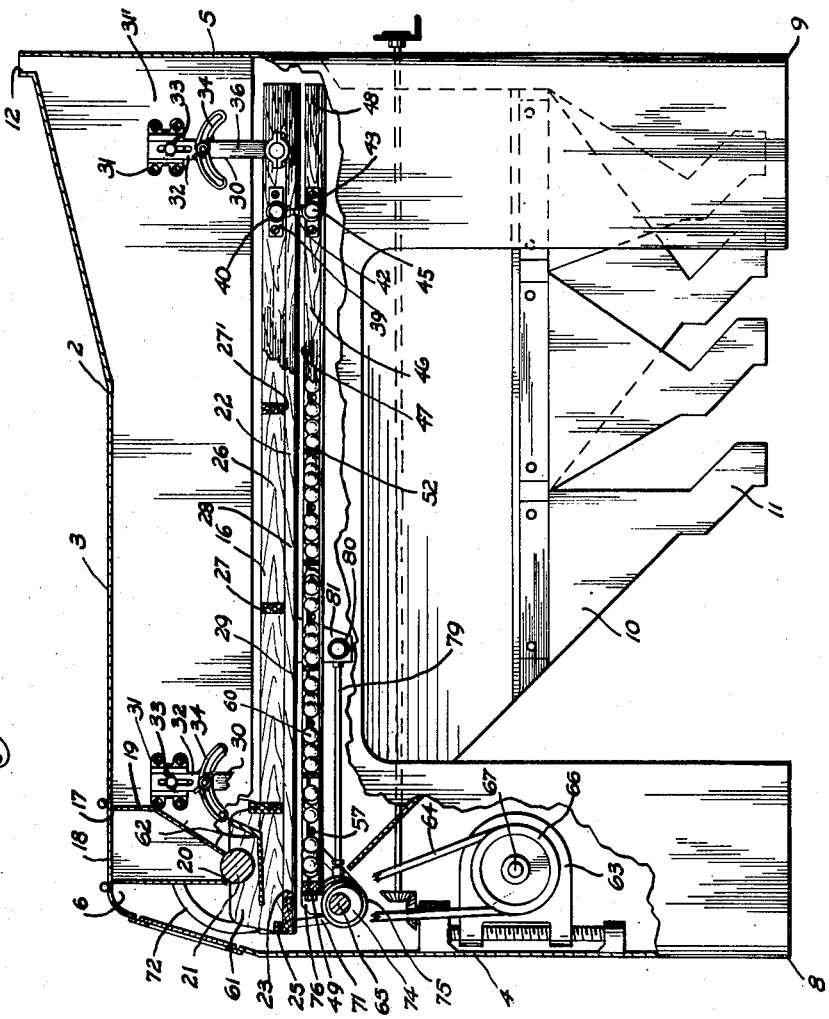
INVENTOR.
John T. Landes and
BY Roger S. Greenough.
Fishburn & Gold
ATTORNEYS.

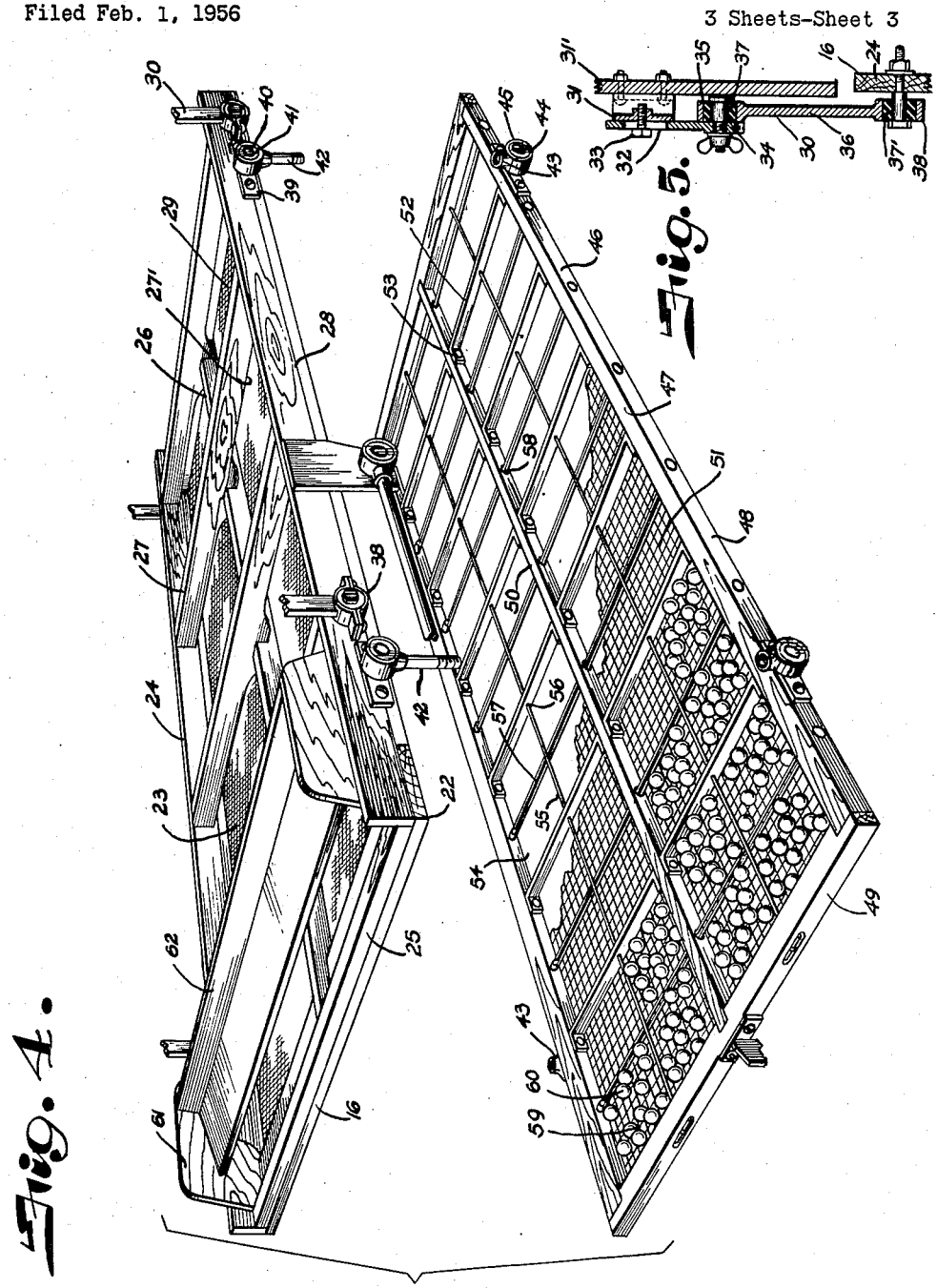

2,829,772
PURIFIER

John T. Landes and Roger S. Greenough, Salina, Kans.

Application February 1, 1956, Serial No. 562,676

3 Claims. (Cl. 209—323)

This invention relates to purifiers for performing separation of granular material, and more particularly to purifiers such as are used in performing particle separation in the manufacture of flour and the like.

Purifiers used in flour manufacture vary in structure but generally have a sieve consisting of a frame with cloth stretched thereacross and some have partitions to divide the sieve into a number of sections. The sieve is usually mounted on a slight slope from a horizontal plane. There are usually separate hoppers and ducts under the sections of the sieve leading to separate compartments. A current of air under control as to intensity is drawn through the sieve as the sieve is vibrated whereby some of the particles pass through the sieve cloth and some of the particles are held in suspension on the sieve and are floated over the end thereof and still other particles are withdrawn from the purifier with the current of air. Flour has some particles that tend to adhere to the sieve cloth and close the openings through the woven mesh thereof, and when the vibration and the air current fail to remove such particles, the reduction in the size of the openings results in improper separation necessitating the operation being shut down for cleaning the sieve.

The objects of the present invention are to provide a purifier structure including a vibrating sieve with mechanism for continuously cleaning the sieve during operation; to provide such a purifier with a plurality of movable objects that are continuously projected against the sieve cloth during operation; to provide such a purifier with a reciprocating rack supported below the sieve cloth and a plurality of gum rubber balls on the rack which are continuously projected against the sieve cloth in response to reciprocation of the rack; to provide such a purifier structure wherein the rack has an open mesh screen extending thereacross under the sieve cloth in suitably spaced relation wherein the balls may move between the screen and the sieve cloth; to provide such a purifier structure wherein the ball supporting rack is swingably supported on the sieve frame; and to provide a purifier with an automatic cleaning sieve structure that is economical to manufacture, and efficient in operation over relatively long periods of time.

In accomplishing these and other objects of the present invention, we have provided improved details of structure, the preferred forms of which are illustrated in the accompanying drawings, wherein:

Fig. 1 is a perspective view of a purifier.

Fig. 2 is an end elevation of the purifier with portions broken away to illustrate the sieve location and reciprocating mechanism therefor.

Fig. 3 is a side elevation of the purifier with portions broken away to illustrate the sieve mounting and structure.

Fig. 4 is a disassembled perspective view of the sieve and ball rack structure.

Fig. 5 is a sectional view through one of the sieve hangers.

Referring more in detail to the drawings:

1 designates a purifier which includes a housing 2 having a top wall 3, end walls 4 and 5, and side walls 6 and 7, with hollow supporting legs 8 and 9 at the ends of the housing. The bottom of the housing is so constructed as to form a plurality of spaced hoppers 10 arranged with downwardly sloping walls connected with ducts 11 and associated with portions of the housing for making a particle separation of flour or the like as later described.

One end of the upper portion of the housing is provided with a suitable outlet 12 for connection with the inlet of a blower (not shown) for cooperation with a plurality of openings 13 of graduated size, as shown in Fig. 1, for inducing a suitable current of air through the housing. The openings 13 are preferably arranged in a cover 14 arranged over an opening 15 in the side wall 7 in spaced relation to the top wall 3 whereby a sieve structure 16 is supported in the housing between the level of the openings 13 and the top wall 3.

Adjacent the end of the housing opposite the connection 12 there is an opening 17 in the top wall 3 provided with a hinged cover 18. During operation of the purifier, the cover 18 is swung whereby the opening 17 is adapted to receive granular particles such as flour for particle size separation, the opening 17 providing communication with a hopper 19 having a discharge 20 controlled by a roller feeder 21 for feeding the material to be separated to the sieve structure 16.

The structure of the purifier housing illustrated and described is exemplary only and may be of any suitable conventional purifier housing structure capable of enclosing the sieve and operating structure therefor.

The sieve 16 includes a frame 22 of substantially rectangular shape and defining the periphery of the sieve opening 23. Longitudinally arranged side members 24 are fixed to and upstanding from the frame 22 at the side edges thereof. End members 25 are secured to the ends of the frame 22 and extend upwardly therefrom to a lesser heighth than the side members 24 and a suitable longitudinal member 26 and transverse members 27 are secured to the frame and/or side and end members thereon to form a rigid structure. The transverse members 27 are preferably spaced longitudinally of the frame and have their lower edges 27' spaced above the bottom surface 28 of said frame so as not to obstruct movement of particles along a foraminous sieve cloth 29 suitably secured to the bottom surface 28 of said frame.

The sieve cloth 29 is preferably of conventional material which may be a single piece or a plurality of pieces suitably sewed together to provide sufficient size to extend across and lengthwise of the frame. The cloth may be all of a single weave to provide an open mesh having openings of a size to pass desired single maximum size particles or may be sections of cloth sewed together wherein the mesh of the sections are of different size. The cloth has each of its marginal edges suitably secured to the frame in a manner that the cloth is taut in both directions.

The frame 22 is suitably supported in the housing 2 above the level of the openings 13 and below the discharge of the hopper 19 by means of hangers 30. The hangers 30 are of conventional structure and each include a stationary bracket 31 suitably fixed to longitudinally extending partitions 31' which extend downwardly from the top wall 3 of the housing 2 and an adjustable bracket 32 secured to the stationary bracket by suitable fastening devices 33 whereby the adjustable bracket may be moved vertically relative to the stationary bracket. Each movable bracket 32 includes a slotted arcuate portion 34 to which is secured a trunnion 35 on which is mounted the upper end of an arm 36 with a rubber bushing 37 in the arm engaged around the trunnion 35. The lower ends of the arms 36 have rubber bushings 37' therein engaged on trunnions 38 extending laterally from the side members 24 of the sieve frame. In the illustrated structure, there are four hangers, one adjacent each of the corners of the sieve frame, and the rubber bushings are such that they provide for swinging movement of the arms 36 for suitable oscillation of the frame and sieve in response to vibratory drive mechanism as later described.

Suitable brackets 39 are secured to the sides of the sieve frame adjacent to and spaced from the trunnions 38 and have trunnions 40 engaged by rubber bushings 41 of hanger arms 42 that depend therefrom which have lower ends 43 provided with rubber bushings 44 that engage trunnions 45 suitably mounted on the sides of a ball rack frame 46 preferably rectangular in shape and of sufficient width and length to extend beyond the inner edges of the side and end members of the sieve frame 22. The arms 42 are of such length that the upper surface 47 of the frame 46 is spaced from the lower surface 28 of the frame 22 sufficiently to provide operating clearance and the arms 42 and the bushings 41 and 44 are such that the frame 46 may be oscillated or swung with respect to the frame 22. The frame 46 includes spaced side members 48 and end members 49 suitably secured together and a central longitudinal member 50 having its ends secured to the end members 49 and preferably arranged to lie substantially under the longitudinal member 26 of the sieve frame.

A wire screen or hardware cloth, preferably having a relatively large mesh such as one-half inch mesh, extends across and lengthwise of the frame 46 and has its marginal edges secured to the side and end members 48 and 49 thereof, the wire mesh 51 being secured whereby it is tensioned and remains taut in both directions. A plurality of spaced relatively thin metal bars 52 extend transversely relative to the frame 46 and each has their ends secured to a side member 48 and the center longitudinal member 50 as at 53. The bars 52 are preferably turned edgewise and are suitably spaced whereby each preferably is arranged under a seam of the sieve cloth 29. The bars 52 have a width substantially equal to the heighth of the side members 48 and longitudinal member 50 of the frame 46 whereby said bars cooperate with the side members, end members and central longitudinal member to form a plurality of sections 54.

The sections 54 are preferably further divided by means of longitudinal dividers 55 which extend longitudinally of the frame 46 between the side members 48 and central longitudinal member 50. In the illustrated structure, the dividers 55 are preferably a length of piano or like wire which extends through apertures 56 in the bars 52 and has the ends suitably secured to the end members 49. The dividers 55 are preferably equally spaced from the side members 48 and central member 50. The sections 54 are further divided by means of suitable dividers 57 that extend transversely of the frame 46. In the illustrated structure, the dividers 57 preferably consist of two piano or like wires arranged substantially together between the bars 52, the wires extending through apertures 58 in the central longitudinal member 50 and having their ends suitably secured to the side members 48 of the frame 46. Each of the wires of the dividers 55 and 57 are preferably adjusted to remain under tension. In the illustrated structure, each of the sections 54 are divided into four smaller sections 59 and a plurality of free impact members such as balls 60 are arranged in each of the sections 59 and when the frame 46 is stationary said balls rest on the wire mesh 51, said balls being of suitable size and shape wherein they will not pass through the opening in the mesh 51 and when resting on said mesh the upper surface of the balls are spaced below the cloth 29. The balls 60 are preferably made of pure gum rubber or other suitable resilient material which may be utilized with edible foods, the material preferably being such that the flour particles do not tend to adhere thereto.

The sieve is preferably supported in the housing 2 whereby the end adjacent the wall 5 is at a level slightly below the end adjacent the end wall 4 to provide the sieve cloth with a slight inclination from the horizontal. The end of the sieve frame adjacent the end wall 4 is provided with upstanding extensions 61 secured to the sides 24 to support a suitable baffle 62 below the discharge end 20 of the hopper 19 whereby particles to be separated are fed onto the baffle 62 and directed to a point adjacent the end member 24 of the sieve whereby the particles will move onto the sieve cloth 29 and progress toward the opposite end thereof.

In order to drive or vibrate the sieve and ball rack structures, a motor 63 is adjustably mounted in one of the hollow legs of the housing preferably adjacent the end wall 4. Said motor is operatively connected as by a belt 64 to a shaft 65 which extends transversely of the housing 2, the belt 64 operating over a pulley 66 on the motor or driving shaft 67 and a pulley 68 on the shaft 65, the adjustment of the motor 63 being such that the belt 64 may be tightened as desired. The shaft 65 is supported in suitable bearings 69 carried by the housing and has a pulley 70 fixed on said shaft and operatively connected by a belt 71 to a pulley 72 fixed on a shaft 73 that drives the feed roller 21. The shaft 65 has an eccentric 74 rotatably mounted in a bearing 75 carried on a bracket 76 suitably fixed to the end member 49 of the frame 46 of the ball rack whereby rotation of the shaft 65 effects an oscillatory or vibratory movement of the ball rack frame 46. Eccentrics 77 are fixed to the shaft 65 and operate in bearings 78 carried at one end of rods 79 and the other end of the rods are suitably connected by a bearing member 80 to a bracket 81 fixed to the sides of the sieve frame 22. In the illustrated structure, there are two eccentrics 77 and two rods 79, one at each side of the sieve frame. The eccentrics 77 preferably are arranged whereby the throw thereof is substantially diametrically opposite to the throw of the eccentric 74 to obtain maximum relative oscillatory movement of the sieve frame 22 and ball rack frame 46.

In operating a purifier constructed and assembled substantially as described, the connection 12 is connected to the intake of a blower to provide an air current in the housing, the air entering through the openings 13 then moving upwardly relatively to the sieve and through the connection 12. Flour or other particles to be separated are then delivered to the hopper 19 and the motor 63 energized to drive the shaft 65 and feed roller 21. Rotation of the shaft 65 effects oscillatory movement of the sieve frame 22 and the ball rack frame 46. As the particles are fed from the hopper 19 by the feed roller 21 on through the baffle 62, particles drop into the sieve frame and move on the sieve cloth 29. The vibration or oscillatory movement of the sieve frame 22 causes particles of a size smaller than the respective openings in the cloth sections to pass through the openings in the sieve cloth 29 and drop on through the openings in the mesh on the ball rack frame 46; some particles will move along the sieve cloth and be discharged off of the end thereof adjacent the end wall 5 into a collecting hopper and some light weight material will be carried by the air currents through the connection 12. As the sieve frame 22 is oscillated or vibrated, the ball rack frame 46 is also oscillated or vibrated relative thereto, and in response to the oscillation of the ball rack 46 the balls 60 bounce from the wire mesh 51 and strike the bottom of the sieve cloth 29 tending to dislodge any particles that adhere to the sieve cloth. The particles dropping through the sieve cloth do not adhere to the balls 60 and can drop freely through the wire mesh 51 into the respective hoppers 10 for delivery through the ducts 11. The balls 60 being resilient and the wire mesh and the dividers 55 and 57 being under tension, the impact of the balls thereagainst tend to provide a substantial acceleration to the balls and vigorous impacting or striking of the sieve cloth 29 by the balls 60 thereby preventing particles from blocking the openings in the sieve cloth and maintaining the sieve in proper operating condition for suitable separation over long periods of time.

It is to be understood that while we have illustrated and described one form of our invention, it is not to be limited to the specific form or arrangement of parts herein described and shown except insofar as such limitations are included in the claims.

What we claim and desire to secure by Letters Patent is:

1. In a purifier for effecting separation of granular particles having a housing with an air connection at one end and a granular particle feed at the other, a sieve frame in the housing and having spaced side and end members, a foraminous sieve cloth stretched across the sieve frame between the side and end members, means in the housing movably supporting the sieve frame for vibratory motion with the sieve cloth arranged at a slight inclination from horizontal, means operatively connected with the sieve frame for effecting oscillatory vibratory movement of the sieve frame whereby granular particles will drop through the foraminous sieve cloth, a second frame having spaced side and end members, a plurality of hangers pivotally mounted on the sieve frame side members and supporting the second frame below and in spaced relation to the sieve frame for longitudinal swinging motion relative to the sieve frame, a sheet of foraminous material having relatively large openings therein extending across the second frame, means securing the margins of the sheet of foraminous material to the side and end members of said second frame and holding said foraminous sheet in tension, a plurality of longitudinal and transverse members in the second frame above the foraminous member and defining a plurality of sections in said second frame, means operatively connected to the second frame for longitudinal reciprocation of said second frame for effecting oscillatory vibratory motion thereof relative to the sieve frame, and a plurality of resilient balls in each of the sections of the second frame supported on the foraminous member and movable in response to the vibratory motion of the second frame to impact the sieve cloth and dislodge granular particles therefrom.

2. In a purifier for effecting separation of granular particles having a housing with an air connection at one end and a granular particle feed at the other, a sieve frame in the housing and having spaced side and end members, a foraminous sieve cloth stretched across the sieve frame between the side and end members, means securing the sieve cloth margins to said side and end members of the sieve frame, a plurality of hanger members in the housing movably supporting the sieve frame for vibratory motion with the sieve cloth arranged at a slight inclination from horizontal, means operatively connected with the sieve frame adjacent the particle feed for effecting oscillatory vibratory movement of the sieve frame whereby granular particles will drop through the foraminous sieve cloth, a second frame having spaced side and end members, means on the sieve frame supporting the second frame below and in spaced relation to the sieve frame for vibratory motion relative to the sieve frame, an open mesh sheet extending across the second frame and held in tension, a plurality of longitudinal and transverse partitions in the second frame above the open mesh sheet and defining a plurality of sections in said second frame, wires extending across said second frame sections above the open mesh sheet and spaced from the partitions and second frame members, said wires being in tension, means operatively connected to the second frame for longitudinal reciprocation of said second frame for effecting oscillatory vibratory motion thereof relative to the sieve frame, and a plurality of free gum rubber balls in each of the sections of the second frame supported on the open mesh sheet and movable in response to the vibratory motion of the second frame to impact the second frame members, partitions and wires and the sieve cloth and dislodge granular particles from said sieve cloth.

3. In a purifier for effecting separation of granular particles having a housing with an air connection at one end and a granular particle feed at the other, a sieve frame in the housing and having spaced side and end members, a foraminous sieve cloth stretched across the sieve frame between the side and end members, means securing the sieve cloth margins to said side and end members of the sieve frame, a plurality of hanger members in the housing movably supporting the sieve frame for vibratory motion with the sieve cloth arranged at a slight inclination from horizontal, means operatively connected with the sieve frame adjacent the particle feed for longitudinal reciprocation of the sieve frame for effecting oscillatory vibratory movement thereof whereby granular particles will drop through the foraminous sieve cloth, a second frame having spaced side and end members, a plurality of hangers pivotally mounted on the sieve frame side members and supporting the second frame below and in spaced relation thereto for longitudinal swinging motion relative to the sieve frame, a sheet of foraminous material having relatively large openings therein extending across the second frame, means securing the margins of the sheet of foraminous material to the side and end members of said second frame and holding said foraminous sheet in tension, a plurality of longitudinal and transverse partition members in the second frame above the foraminous member and defining a plurality of sections in said second frame, wires extending longitudinally and transversely of the second frame substantially midway between the partitions and second frame members, said wires being in tension, means operatively connected to the second frame for longitudinal reciprocation of the second frame for effecting oscillatory vibratory motion thereof relative to the sieve frame, and a plurality of gum rubber balls in each of the sections of the second frame supported on the foraminous member and movable in response to the vibratory motion of the second frame to impact the second frame members, partitions and wires and the sieve cloth and dislodge granular particles from said sieve cloth.

References Cited in the file of this patent

UNITED STATES PATENTS

| | | |
|---|---|---|
| 1,862,818 | Forsberg | June 14, 1932 |
| 2,020,013 | Bailey | Nov. 5, 1935 |
| 2,667,972 | Johnson | Feb. 2, 1954 |